United States Patent [19]
Nerone

[11] Patent Number: 5,703,439
[45] Date of Patent: Dec. 30, 1997

[54] LAMP POWER SUPPLY CIRCUIT WITH ELECTRONIC FEEDBACK CIRCUIT FOR SWITCH CONTROL

[75] Inventor: Louis R. Nerone, Brecksville, Ohio

[73] Assignee: General Electric Company, Schenectady, N.Y.

[21] Appl. No.: 644,466

[22] Filed: May 10, 1996

[51] Int. Cl.$^6$ .................................................. H05B 37/02
[52] U.S. Cl. ...................... 315/209 R; 315/219; 315/224; 315/DIG. 7
[58] Field of Search .................... 315/219, 209 R, 315/307, 224, 244, 291, DIG. 5, DIG. 7

[56] References Cited

U.S. PATENT DOCUMENTS

| | | | |
|---|---|---|---|
| 4,251,752 | 2/1981 | Stolz | 315/206 |
| 4,383,203 | 5/1983 | Stanley | 315/248 |
| 4,443,778 | 4/1984 | Mewissen | 315/57 X |
| 4,503,360 | 3/1985 | Bedel | 315/112 |
| 4,523,131 | 6/1985 | Zansky | 315/307 |
| 4,546,290 | 10/1985 | Kerkes | 315/209 R |
| 4,570,105 | 2/1986 | Engel | 315/58 |
| 4,988,920 | 1/1991 | Hoeksma | 315/101 |
| 5,075,599 | 12/1991 | Overgoor et al. | 315/224 |
| 5,341,068 | 8/1994 | Nerone et al. | 315/219 |
| 5,363,020 | 11/1994 | Chen et al. | 315/209 R |
| 5,414,325 | 5/1995 | Allison | 315/158 |
| 5,546,300 | 8/1996 | Lee et al. | 315/209 R X |
| 5,550,436 | 8/1996 | Houk | 315/209 R |

Primary Examiner—Robert Pascal
Assistant Examiner—Haissa Philogene
Attorney, Agent, or Firm—George E. Hawranko

[57] ABSTRACT

Disclosed is a ballast circuit for a gas discharge lamp, including a resonant load circuit with a gas discharge lamp and first and second resonant impedances whose values determine the operating frequency of the resonant load circuit. The ballast circuit further includes a d.c.-to-a.c. converter circuit coupled to the resonant load circuit so as to induce an a.c. current in the resonant load circuit. The converter circuit comprises first and second switches serially connected between a bus conductor at a d.c. voltage and ground, and has a common node through which the bidirectional load current flows. A feedback arrangement regeneratively controls the first and second switches, and includes a circuit for sensing a.c. current in the resonant load circuit and producing a feedback signal in proportion to the a.c. current. The feedback arrangement includes a comparator circuit for comparing the feedback signal with a periodic reference signal, and for producing a comparator output signal that changes state when a first one of the compared signals becomes greater than the second of the compared signals, and that further changes state when the second of the compared signals then becomes greater than the first of the compared signals. Further included in the feedback arrangement is a circuit for generating the periodic reference signal in response to the comparator output signal, and a conditioning circuit receptive of the comparator output signal for controlling the first and second switches.

16 Claims, 4 Drawing Sheets

LAMP POWER SUPPLY CIRCUIT WITH ELECTRONIC FEEDBACK CIRCUIT FOR SWITCH CONTROL

CROSS-REFERENCE TO RELATED APPLICATION

This application is related to commonly assigned application Ser. No. 08/644,318, entitled "Lamp Power Supply Circuit with Feedback Circuit for Dynamically Adjusting Lamp Current," by Louis R. Nerone, the present inventor. The foregoing application was concurrently filed with, and is co-pending with, the instant application.

FIELD OF THE INVENTION

The present invention relates to a power supply, or ballast, circuit for a gas discharge lamp. More particularly, it relates to such a power supply circuit employing plural power switches that are controlled in a regenerative fashion, i.e., without the need for an oscillator for controlling the switches.

BACKGROUND OF THE INVENTION

In the field of residential and/or consumer lighting, there have been significant efforts made in the past several years to encourage more widespread public use of compact fluorescent lamps in place of less efficient incandescent lamps. Because of the significant energy savings that a fluorescent lamp offers over the use of an incandescent lamp while still attaining a comparable level of light output, public acceptance of such a lamp could contribute to the overall aim of conserving energy and the natural resources that are used to generate such energy. It is also a significant advantage that such compact fluorescent lamps have a considerably longer life than a conventional incandescent lamp, and are the fastest growing segment in the fluorescent lamps market place today. To this end, compact fluorescent lamps have been introduced having a standard type of lamp base so that they may be inserted into a typical lamp socket. An example of such a compact fluorescent lamp can be found in U.S. Pat. No. 4,503,360 issued on Mar. 5, 1985 to D. E. Bedel. Although the lamp of this patent in an electroded compact fluorescent lamp, it is possible to achieve an even longer lamp life using an electrodeless fluorescent lamp as described in U.S. Pat. No. 4,010,400 issued to Hollister on Mar. 1, 1977.

As with most fluorescent or low pressure discharge lamp devices, it is necessary to provide ballasting circuit to perform the function of conditioning the current signal used to drive the discharge lamp. Examples of typical ballasting circuits for a compact fluorescent lamp can be found in U.S. Pat. Nos. 4,443,778 and 4,570,105 issued respectively on Apr. 17, 1984 to J. S. C. Mewissen and Feb. 11, 1986 to H. J. Engel. It will be noted that the ballasting circuits described in each of these patents relies on an electromagnetic type of ballasting; that is, one that requires the use of a magnetic core transformer to condition the current signal. Because such a ballasting arrangement operates at a power line current frequency of 60 Hz which can result in lamp flicker, it has been determined that an electronic high frequency ballast that would eliminate the occurrence of lamp flicker or light variation, would be preferable. An example of a high frequency electronic ballast arrangement for a gas discharge lamp can be found in U.S. Pat. No. 4,546,290 issued to B. Kerekes on Oct. 8, 1985. An example of a circuit for an electrodeless fluorescent product can be found in U.S. Pat. No. 4,383,203 issued to Stanley on May 10, 1983. It will be noted that typical electronic circuits of this type are of a self-resonant variety wherein a sample of the resonant current is taken to signal the switching of the bipolar transistor. Though this arrangement has proven to be simple and reliable in some applications, its efficiency at operating frequencies above 20 kHz is less desirable since the dynamic losses in the switching devices can be prohibitive. The term "dynamic losses" can be considered as that amount of energy in the circuit that is diverted away from the energization of the lamp and is otherwise lost in the form of heat dissipated. As such, if dynamic losses are not kept in check, the switching devices could experience a thermal runaway condition or operate at such a high temperature that reliability guidelines are exceeded. U.S. Pat. No. 4,988,920 issued on Jan. 29, 1991 to G. S. Hoeksma illustrates a more recent example of an electronic ballast circuit for a typical fluorescent lamp. In this patent, semiconductor switching devices such as metal oxide semiconductor field effect transistors (MOSFETs) are utilized to achieve the necessary switching frequency that allows the ballast to operate at a higher frequency than does a typical electromagnetic ballast arrangement or even electronic ballast which uses bipolar transistors for switching. It has been found that MOSFET devices offer advantages over the bipolar transistor approach and that such MOSFETs can also be reliably operated at yet a higher frequency than the bipolar devices. In addition to the advantage that an electronic ballast will weigh significantly less than its magnetic counterpart, the electronic ballast, by operating at the higher frequency, provides for higher light output, avoids the problem of light flicker and further reduces light output variation relative to a ballast operating at 60 Hz.

A prior art ballast circuit of the foregoing type is disclosed in U.S. Pat. No. 5,341,068 issued Aug. 23, 1994, entitled "Electronic Ballast Arrangement for a Compact Fluorescent Lamp," by Louis R. Nerone, the present inventor, and assigned to the present assignee. The disclosed ballast circuit utilizes feedback circuitry for controlling the mentioned pair of power switches of the d.c.-to-a.c. converter. The feedback circuitry operates in response to a feedback signal representing an a.c. current in the resonant load circuit.

The use of the foregoing circuitry for controlling the power switches beneficially results in regenerative, or so-called self-resonant, control of the power switches. Accordingly, the ballast circuit of the foregoing patent application avoids the expense and bulk of extra circuitry for switch control. However, the feedback circuitry of the foregoing patent application utilizes a magnetic-core transformer with multiple windings. The inclusion of such transformer adds considerable bulk to ballast size, which is an especially acute issue with so-called compact fluorescent lamps having a standard screw-type base for insertion into a conventional incandescent lamp socket.

Additionally, there are further drawbacks to the use of transformers in feedback circuitry for regeneratively controlling the power switches. For instance, the charge on the gates, or control terminals, of the power switches can adversely affect switching characteristics, such as the so-called dead time, i.e., the time during which the gate drive for both power switches is off. Also, driving a capacitive load is a drawback when using MOSFET power switches.

OBJECTS AND SUMMARY OF THE INVENTION

It is, therefore, an object of the present invention to provide a ballast circuit for a gas discharge lamp that includes, for controlling a pair of power switches, a self-resonant feedback circuit whose components can be implemented in solid-state form, as opposed to the use of a magnetic transformer.

A further object of the invention is to provide a ballast circuit for a gas discharge lamp that includes, for controlling a pair of power switches, a self-resonant feedback circuit, the majority of whose components can be incorporated into an integrated circuit.

In accordance with one form of the invention, there is provided a ballast circuit for a gas discharge lamp, including a resonant load circuit with a gas discharge lamp and first and second resonant impedances whose values determine the operating frequency of the resonant load circuit. The ballast circuit further includes a d.c.-to-a.c. converter circuit coupled to the resonant load circuit so as to induce an a.c. current in the resonant load circuit. The converter circuit comprises first and second switches serially connected between a bus conductor at a d.c. voltage and ground, and has a common node through which the bidirectional load current flows. A feedback arrangement regeneratively controls the first and second switches, and includes a circuit for sensing a.c. current in the resonant load circuit and producing a feedback signal in proportion to the a.c. current. The feedback arrangement includes a comparator circuit for comparing the feedback signal with a periodic reference signal, and for producing a comparator output signal that changes state when a first one of the compared signals becomes greater than the second of the compared signals, and that further changes state when the second of the compared signals then becomes greater than the first of the compared signals. Further included in the feedback arrangement is a circuit for generating the periodic reference signal in response to the comparator output signal, and a conditioning circuit receptive of the comparator output signal for controlling the first and second switches.

BRIEF DESCRIPTION OF THE DRAWINGS

In the following detailed description, reference will be made to the attached drawings in which like reference numerals refer to like, or corresponding elements, throughout the following figures.

DETAILED DESCRIPTION OF THE PREFERRED EMBODIMENTS

Figure 1:
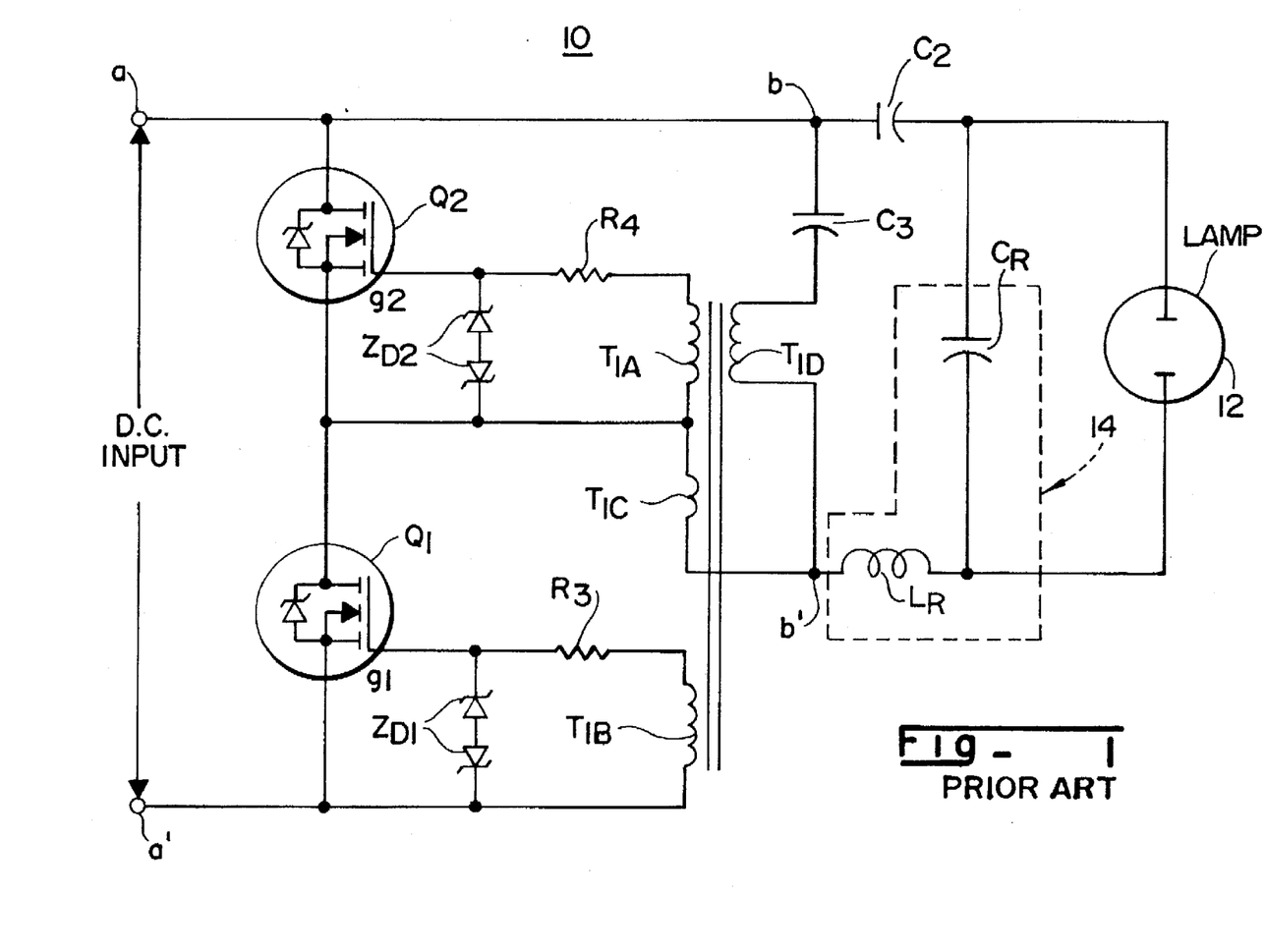
FIG. 1 is a schematic representation of a prior art ballast circuit for a gas discharge lamp that uses a multiple-winding transformer in a feedback circuit for providing self-resonant control of a pair of power switches.

As shown in FIG. 1, a prior art electronic ballast arrangement for a compact fluorescent lamp shown, referenced generally as 10, is effective for converting a standard power line current into a high frequency pulsed signal for driving a compact fluorescent lamp 12. The ballast converter circuit 10 receives a d.c. input signal at terminals a–a', which input signal has been derived from an a.c. input power line and has been rectified and, optionally, corrected for power factor by a rectification and power factor correction circuit (not shown).

The d.c. input signal received by ballast circuit 10 is coupled across a pair of serially connected power MOSFETs designated $Q_1$ and $Q_2$ and which can be provided by International Rectifier of El Segundo, Calif. under the product designation HEXFET MOSFET (HEXFET is a registered trademark of International Rectifier). The power MOSFETs $Q_1$ and $Q_2$ are effective upon receiving a control signal at their respective gate, or control, terminals thereto ($g_1$ and $g_2$) for alternately switching between an on and an off condition at a high frequency, thereby achieving a high frequency oscillation and allowing the ballast designer to avoid the problems that a self-resonant type of ballast experiences, namely, such a ballast typically cannot operate at a frequency above 20 kHz without experiencing a significant drop in efficiency. As seen in FIG. 1 however, to achieve the high frequency operation of $Q_1$ and $Q_2$, it is necessary to inject a pulse of current at the gate terminals $g_1$ and $g_2$ in order to speed up the switching operation. The current pulse that is injected onto the respective gate terminals $g_1$ and $g_2$ is obtained from the shunt circuit arrangement which is shown disposed across nodes b–b' of the overall ballast converter circuit 10 and which consists of capacitor $C_3$, and a tertiary winding $T_{1D}$ of the ballast transformer $T_1$. Also connected across nodes b–b', in a parallel manner to the previously mentioned shunt circuit arrangement, is the series resonant lamp circuit which consists of the resonant circuit 14, having the inductor and capacitor elements $L_R$ and $C_R$ selected in size using conventional design means to achieve the desired resonant operating frequency of the lamp 12, capacitor $C_2$, which blocks d.c. current from reaching lamp 12, and the lamp 12, which may comprise a compact fluorescent lamp. The prior art ballast circuit arrangement 10 of FIG. 1 further includes first and second Zener diode pairs $Z_{D1}$ and $Z_{D2}$ disposed between the respective gate and drain terminals of MOSFETs $Q_1$ and $Q_2$ for the purpose of protecting such respective gate terminals $g_1$ and $g_2$ in the event of an over-voltage condition. Additionally, resistors $R_3$ and $R_4$ are intended to improve waveform stability and to reduce the potential for high frequency oscillations occurring as a result of the high switching speeds at which $Q_1$ and $Q_2$ are expected to operate. Multiple-winding transformer $T_1$ may have 25 turns each on winding $T_{1A}$, $T_{1B}$ and $T_{1D}$, and 2 turns on winding $T_{1C}$, which is used in a feedback capacity for sensing current in lamp 12.

In the operation of the electronic ballast arrangement 10 shown in FIG. 1, the dynamic losses are reduced by the fact that the switching speed is increased, the theory being that by increasing the speed-up signal such that the switches are operated to the on condition at a much faster rate, energy cannot flow into the switching devices as opposed to the load circuit, the path to which the switching device $Q_1$ and $Q_2$ opens when in the on condition. However, it must be understood that the electromagnetic interference (EMI) caused by this faster switching also occurs at a higher frequency. As such, the performance of the ballast arrangement 10 of FIG. 1 must be evaluated from the standpoint of whether such EMI falls within the previously mentioned compliance band. The fundamental component resulting from the rate of change in voltage associated with the high frequency pulse injected onto the switching devices $Q_1$ and $Q_2$ to increase speed, can be represented by the equation:

$$\omega_1 = \pi/t_r \qquad (eq. 1)$$

where: $\omega_1$ is the fundamental component of frequency associated with the rate of change of voltage (dv/dt), and $t_r$ is the rise time of the voltage, measured in seconds.

From this relationship, it can be seen that as $t_r$ decreases the switching interval is reduced. That is, increase switching speed increases the fundamental component of frequency. For instance, if $t_r$ were to be selected as 100 ns (nanoseconds), $\omega_1$ would equal 10 megaradians per second, which is approximately equivalent to 1.592 MHz, a value clearly within the FCC compliance band of 400 kHz to 30 mHz. The capability of generating this speed up pulse which results in the fundamental component falling within the compliance band results from the fact that the speed up winding ($T_{1D}$ in FIG. 1) is connected across the output of the ballast arrangement 10 shown in FIG. 1. Because of this shunt circuit arrangement ($C_3$ and $T_{1D}$), energy stored in inductor $L_R$ of resonant circuit 14 allows current to transfer very rapidly from the switching device $Q_1$ or $Q_2$ that is turning off, to the switching device $Q_1$ or $Q_2$ that is turning on. This rapid transition of current would result in a relatively large rate of change in voltage (dv/dt) thus resulting in the generation of EMI in the compliance band.

Figure 2:
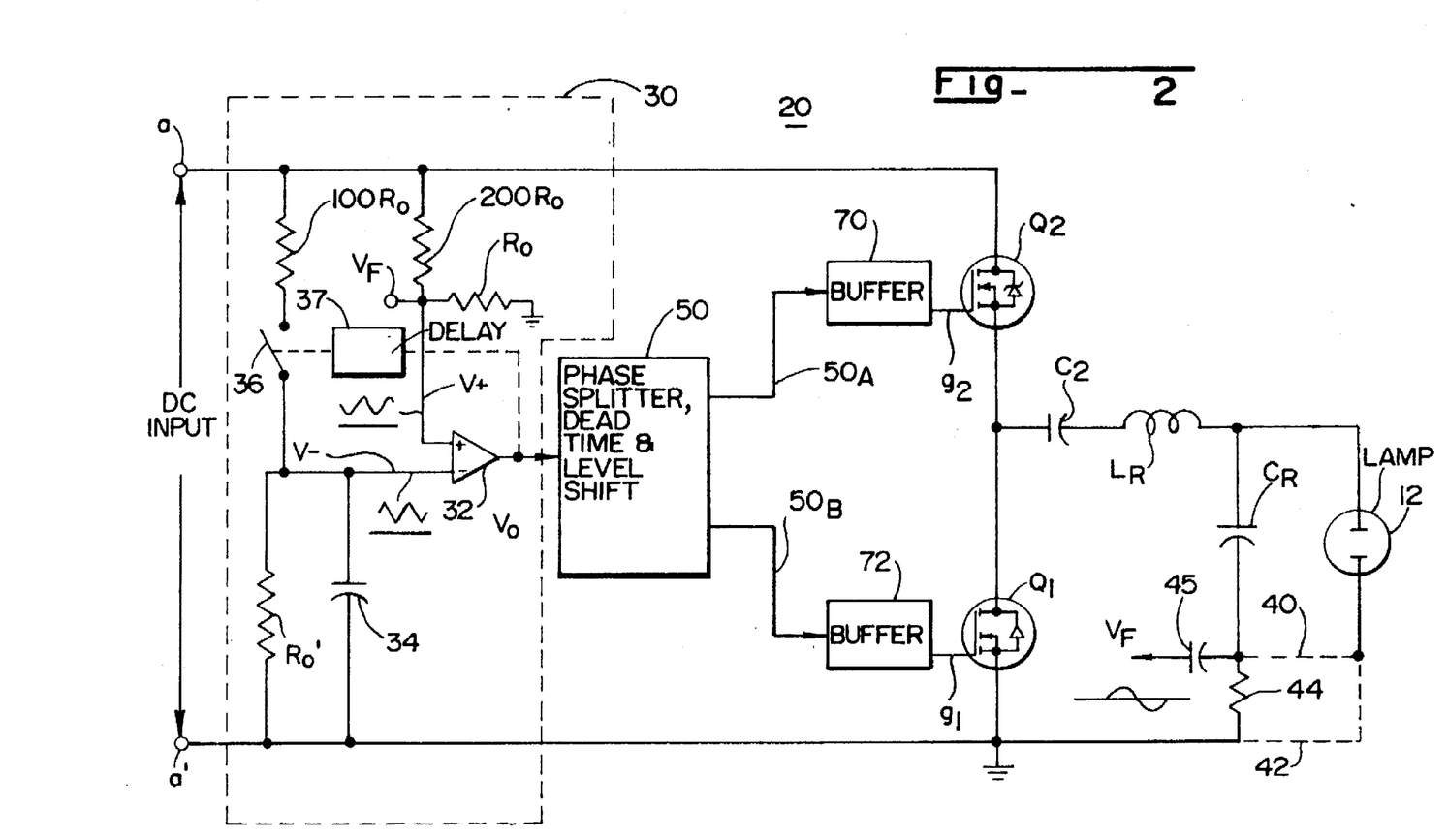
FIG. 2 is a schematic representation of a ballast circuit for a gas discharge lamp, in accordance with the invention, that exclusively uses electronic components in a feedback circuit for implementing self-resonant control of a pair of power switches.

Referring to FIG. 2, an electronic ballast arrangement for a gas discharge lamp, such as a compact fluorescent lamp is shown, and referenced generally as 20. Elements in FIG. 2 (and the further figures) that have reference numerals corresponding to those in FIG. 1 designate like, or corresponding, elements. As such, for instance, description of d.c. blocking capacitor $C_2$ or resonant inductor $L_R$ of FIG. 2 is provided in the above description of the like-numbered parts in FIG. 1.

Electronic ballast arrangement 20 of FIG. 2 does not use the transformer $T_1$ of FIG. 1 and its four windings $T_{1A}$–$T_{1D}$; nor does it use the Zener diode pairs $Z_{D1}$ and $Z_{D2}$ and associated resistors $R_3$ and $R_4$ provided in the circuitry for control of gates $g_1$ and $g_2$ of MOSFET switches $Q_1$ and $Q_2$. As described above, the foregoing, omitted circuitry provides self-resonant feedback control of power MOSFET switches $Q_1$ and $Q_2$ in FIG. 1. Such function is, instead, implemented in FIG. 2 with electronic components, the majority of which can be conveniently incorporated into an integrated circuit for controlling operation of ballast arrangement 20.

In FIG. 2, phase control for controlling the alternate switching of MOSFET switches $Q_1$ and $Q_2$ is provided by a phase control circuit 30. A comparator 32 in circuit 30 receives at its non-inverting input a voltage $V_+$, which is a feedback voltage $V_F$ that is proportional to current in lamp 12. Shown in phantom leading from lamp 12 are alternative conductors 40 and 42. Either one of such conductors is used, the other being omitted. Conductor 40 is preferably used for a relatively low d.c. input voltage to circuit 20, e.g. 160 volts, whereas conductor 42 is preferably used for a relatively high d.c. input voltage, e.g. 300 volts. In any event, the current directed through a resistor 44 and the resulting voltage across such resistor have the same phase as the current in lamp 12. Feedback voltage $V_F$ is derived from the voltage across resistor 44, via a d.c. blocking capacitor 45. Feedback voltage $V_F$ typically has an approximate (or at least somewhat) sinusoidal waveform, as shown in FIG. 2. Voltage $V_F$ is approximately symmetrical about the zero-voltage axis, or ground, and, if necessary, may be provided with a d.c. offset before being input into comparator 32.

(Such an offset may typically be required for comparator 32 to properly operate within its input common mode range if incorporated in an integrated circuit having only a single-polarity voltage supply.)

A voltage-divider network in phase control circuit 30, comprising a grounded resistor designated $R_o$ and one designated $200R_o$, provide a d.c. offset to feedback voltage $V_F$, which is received as non-inverting voltage $V_+$ by comparator 32. The value of resistor $R_o$ is some constant, such as 10 k ohms, and the value of resistor $200R_o$ is 200 times higher. With the d.c. input voltage to circuit 20 being, e.g., 300 volts, the d.c. offset of voltage $V_+$ is:

$$\frac{300 * R_o}{200 R_o + R_o} \qquad (eq. 2)$$

The foregoing value, or d.c. offset of voltage $V_+$, is approximately 1.5 volts.

Meanwhile, circuitry is provided in phase control circuit 30 for generating a voltage $V_-$ at the inverting input of comparator 32. Voltage $V_-$ approximates a triangular wave that may have a d.c. offset, as indicated in FIG. 2. It is the voltage on a capacitor 34, which is charged from the d.c. input voltage via resistor $100R_o$ when a single-pole switch 36 is on (or conducting), and is discharged via resistor $R_o'$ when switch 36 is off (or non-conducting). Resistor $R_o'$ has the same value as resistor $R_o$. The conduction state of switch 36 depends on the output voltage $V_o$ of comparator 32, preferably with a slight delay as indicated by block 37. The operation of switch 36 is now explained with reference to FIG. 3.

Figure 3:
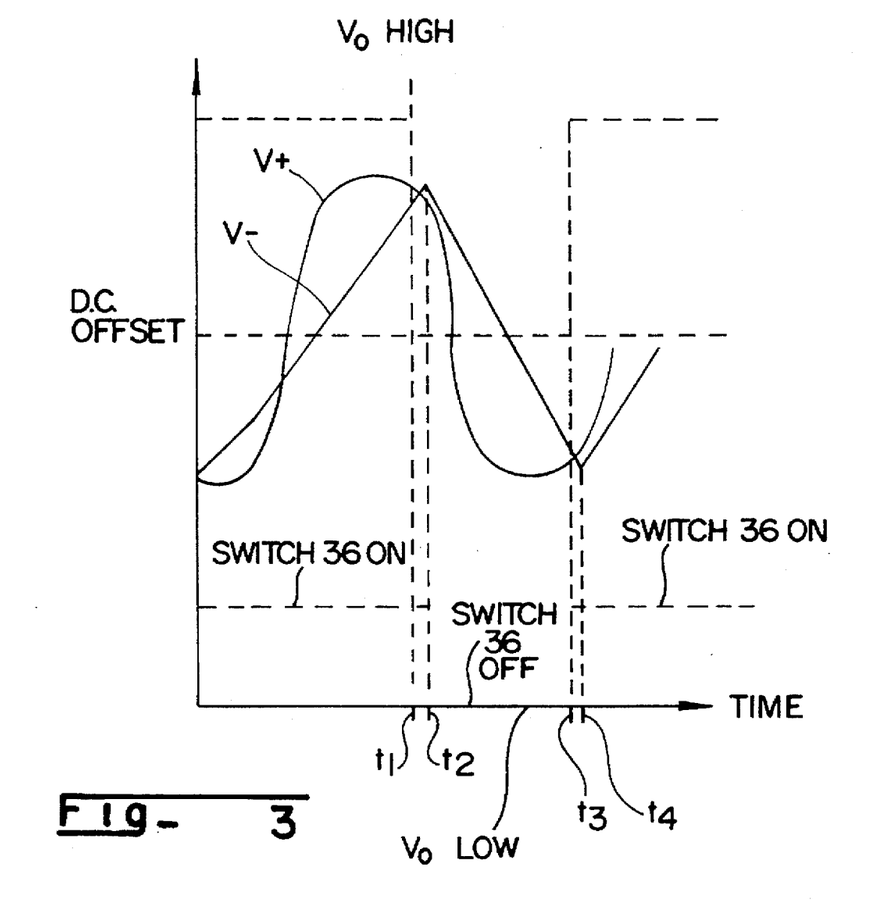
FIG. 3 shows various voltage waveforms together with state diagrams for the output $V_o$ of comparator 32 and of switch 36 of FIG. 2.

FIG. 3 shows voltage waveforms for comparator input voltages $V_+$ and $V_-$ on the same voltage scale, and shows a d.c. offset voltage, which is assumed the same for both voltages $V_+$ and $V_-$. FIG. 3 also shows a high/low state diagram for comparator output voltage $V_o$, and an on/off state diagram for switch 36; these state diagrams have arbitrary vertical scales relative to comparator input voltages $V_+$ and $V_-$. With respect to operation of switch 36, the comparator output voltage $V_o$ switches from a high state to a low state at time $t_1$. Preferably, however, a slight delay (e.g., 100 microseconds) provided by delay block 37 (FIG. 2) occurs in the interval between times $t_1$ and $t_2$ before switch 36 is switched to an off state. Such a delay also occurs in the interval between times $t_3$ and $t_4$, and so on every time the comparator output changes state; such delays serve to assure a stable change of output state of the comparator, or, in other words, to provide the comparator with noise immunity.

Figure 4:
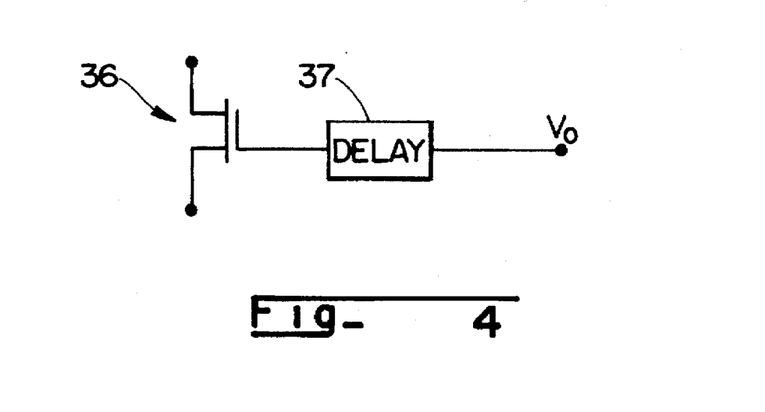
FIG. 4 is detail view showing a possible implementation of switch 36 of FIG. 1.

Switch 36 may be implemented as an n-channel, enhancement-mode MOSFET 36 shown in the detail view of FIG. 4. Delay block 37 is suitably conventional.

Referring more particularly to comparator input waveforms $V_+$ and $V_-$, the d.c. offset of the approximately triangular waveform $V_-$ is determined by a voltage-divider network comprising resistor $R_o'$ and resistor $100R_o$. Assuming, for instance, that the d.c. input voltage to circuit 20 is 300 volts, and further assuming that the duty cycle of switch 36 is 0.5, or ½, the d.c. offset of voltage $V_-$ is defined by the following formula:

$$\frac{300 * R_o'}{(R_o' + 100R_o) * 2} \qquad (eq. 3)$$

With $R_o = R_o'$, the foregoing value, or d.c. offset of voltage $V_-$, is approximately 1.5 volts, and is approximately the same as the d.c. offset of voltage $V_+$ described above with respect to equation 2. The duty cycle of switch 36 should be approximately ½ so that the positive and negative excursions of current through lamp 12 are approximately symmetrical to each other about ground potential, although shifted in time with respect to each other.

As shown in FIG. 3, comparator input waveform $V_-$ approximates a triangular waveform. Its upward slope is set by selection of resistor $100R_o$ and capacitor 34 (FIG. 2). Its downward slope is set by selection of resistor $R_o'$ and capacitor 34. It is preferred that the upward and downward slopes of voltage $V_-$ be from a fairly linear part of the increases and decreases in voltage of capacitor 34, which are exponential; e.g., within the first quarter of the respective time constants for charging and discharging the capacitor. This insures at time $t_1$ in FIG. 3, for instance, that input voltage $V_-$ distinctly surpasses the magnitude of input voltage $V_-$ so that comparator 32 will reliably change its output state to a low value; if, in contrast, waveform $V_-$ rounded off to a more level slope at time $t_1$, the desired change of output state of the comparator would be less certain to occur. (The invention would work, however, even if the voltage $V_-$ is comprised of a predominantly positive-going portion and a predominantly negative-going portion, so long as the following comparator operation occurs.)

In accordance with operation of comparator 32 (FIG. 2), comparator output $V_o$ changes from a high level to a low level when input $V_-$ exceeds input $V_+$, shown at time $t_1$ in FIG. 3, and changes from a low level to a high level when input $V_+$ exceeds input $V_-$, shown at time $t_3$ in FIG. 3. The output of comparator 32 may be alternatively described as changing levels whenever the absolute value of the a.c. portion of voltage $V_-$ becomes higher than the absolute value of the a.c. portion of voltage $V_+$, where the following condition is satisfied: Both the waveform for voltage $V_-$ and the waveform for voltage $V_+$ have excursions above an axis of strength that are substantially mirror-images of their excursions below such reference axis, although shifted in time with respect to each other.

Comparator output voltage $V_o$ will typically have a phase advance of, e.g., 20°, to offset the phase delay of, e.g. 20°, occurring in ballast arrangement 20 (FIG. 2) between power switches $Q_1$ and $Q_2$ and current-sensing resistor 44. More generally, however, the phase advance of comparator output voltage $V_o$ could additionally include 360°, or multiples of 360°, phase advance. Comparator output $V_o$ contains the necessary phase information to control operation of power MOSFET switches $Q_1$ and $Q_2$, as will be further described below.

As can be appreciated from equations 2 and 3 above, the d.c. offsets of voltages $V_+$ and $V_-$ (FIG. 3) are approximately the same, e.g. both about 1.5 volts where the d.c. input voltage is 300 volts. The d.c. offsets are chosen so that comparator 32 operates within its common mode. The d.c. offsets can be changed, for instance, by proportionately varying resistors $100R_o$ and $200R_o$ in phase control circuit 30. Thus, for instance, it can be appreciated from equations 1 and 2 above that the d.c. offsets can be approximately doubled by reducing the values of resistors $100R_o$ and $200R_o$ to $50R_o$ and $100R_o$, respectively.

Beneficially, using the phase control circuit 30 of FIG. 2, the power level of lamp 12 can be adjusted by changing the upward and downward slopes of voltage $V_-$. By making the slopes both steeper, the comparator output will change earlier, causing the frequency to increase, as is apparent from FIG. 3, thereby decreasing the power level of the lamp. This can be done by reducing the R*C time constant for the charging and discharging paths for capacitor 34. For instance, the selection of a lower value of capacitance for capacitor 34 results in such capacitor more rapidly charging and discharging (and, hence, steeper slopes for voltage $V_-$ in FIG. 3). It can also be accomplished by varying the values of the charging and discharging resistors for the capacitor, designated in FIG. 3 as $100R_o$ and $R_o'$.

Figure 5:
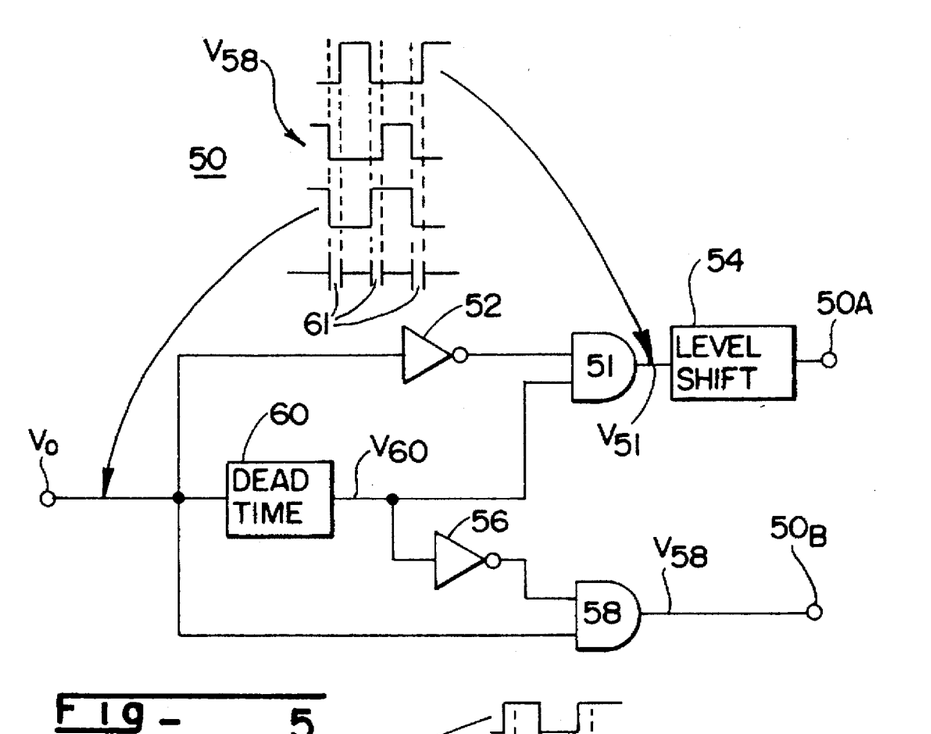
FIG. 5 is a schematic representation of an exemplary implementation of phase splitter, dead time & level shift circuit 50 of FIG. 2.
Figure 6:
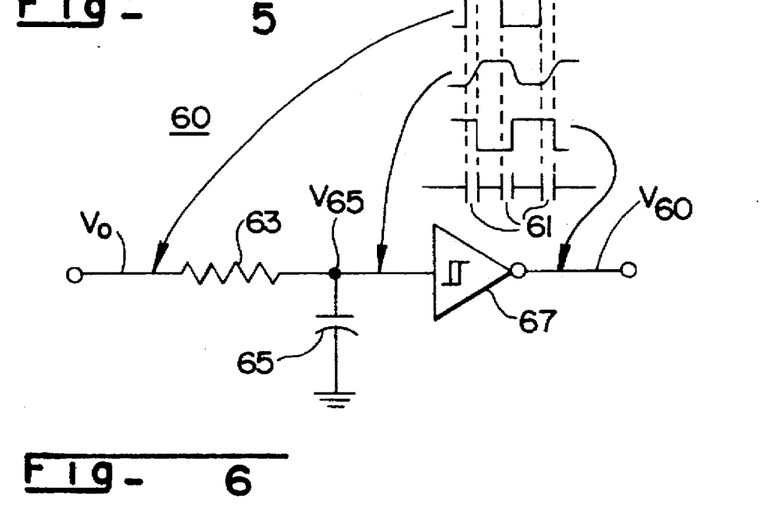
FIG. 6 is a schematic representation of an exemplary implementation of dead time circuit 60 of FIG. 5.

Referring again to FIG. 2, comparator output $V_o$ is received by phase splitter, dead time & level shift circuit 50, described below in connection with FIG. 5. Circuit 50 provides appropriate signals on lines 50A and 50B that are respectively received by conventional buffers 70 and 72. These buffers are used to drive the gates of MOSFET switches $Q_1$ and $Q_2$ with a low impedance, and thus, for instance, replace the function of the speed-up pulses described above in connection with prior art FIG. 1. FIG. 5 shows an exemplary implementation of phase splitter, dead time & level shift circuit 50 of FIG. 2. As FIG. 5 shows, comparator output voltage $V_o$ is applied to a dead time circuit 60, one implementation of which is shown in FIG. 6. In FIG. 6, a circuit comprising resistor 63 and capacitor 65 receives comparator output voltage $V_o$, and provides a delayed input, shown as voltage $V_{65}$, to a logic NOT gate 67. Gate 67 is of the type having hysteresis, as indicated by the hysteresis notation in the symbol for gate 67, whereby its input threshold voltage is a function of the state of its output voltage. Gate 67 produces an output voltage $V_{60}$, which transitions in the opposite manner from comparator output $V_o$, but only after respective delay (or dead-time) intervals 61. A typical delay interval 61 for a lamp operating at a frequency of 50 kilohertz is one microsecond.

Referring back to FIG. 5, dead-time circuit output voltage $V_{60}$ is then input into a logic AND gate 51. The other input to gate 51 is the output of logic NOT gate 52, which inverts comparator output $V_o$. The output of AND gate 51, voltage $V_{51}$, is shown in FIG. 5. The output $V_{51}$ is then level-shifted by a conventional level shift circuit 54, to provide an appropriate signal on conductor 50A to drive the gate of upper MOSFET $Q_1$ in FIG. 2 after passing through buffer 70 (FIG. 2).

For driving the gate of the lower MOSFET $Q_2$ in FIG. 2, a gate-driving voltage $V_{58}$ is produced by the circuit of FIG. 5. To accomplish this, a logic NOT gate 56 first inverts dead-time circuit output $V_{60}$ and applies the resulting voltage as one input to logic AND gate 58. The other input to AND gate 58 is comparator output voltage $V_o$. Due to the inclusion of NOT gate 56, the gate-driving output voltage $V_{58}$ of AND gate 58 appears as shown in the figure, with its phase shifted 180° from the phase of gate-drive signal $V_{51}$. This realizes the phase-splitting function of circuit 50.

As further shown in FIG. 5, the high states of gate-drive signal $V_{58}$ are separated from the high states of gate-drive signal $V_{51}$, on both leading and trailing sides, by dead-time intervals 61. This assures high speed operation of MOSFET switches $Q_1$ and $Q_2$, since so-called soft switching techniques (e.g., zero-voltage switching) can be employed.

The various functions of phase splitter, dead time & level shift circuit 50 of FIGS. 2 and 5, as well as the function of buffers 70 and 72 in FIG. 2, can be implemented in an obvious manner by those of ordinary skill in the art. For instance, an IR2155 self-oscillating power MOSFET/IGBT gate driver from International Rectifier of El Segundo, Calif., could be utilized with the connections illustrated for "bootstrap operation" in its Provisional Data Sheet 6.029, dated Jan. 13, 1994. With the foregoing gate driver, the so-called RT input can be left open, and the present comparator output $V_o$ can be applied to the so-called CT input of the gate driver. However, the ability to set the dead time of present dead-time circuit 60 of FIGS. 5 and 6 is not present with the use of the foregoing gate driver.

Exemplary circuit values for a circuit for 20-watt fluorescent lamp 12 with an operating current of 50 kilo-hertz, with a d.c. input voltage of 300 volts, are as follows: In FIG. 2, resistor value $R_o$ (or $R_o'$) of 6.2 k ohms; capacitor 34, 3.3 nanofarads; delay circuit 37, one microsecond of delay; resonant inductor $L_R$, 750 microhenries; resonant capacitor $C_R$, 6.8 nanofarads; d.c. blocking capacitor $C_2$, 0.47 microfarads; resistor 44, 1.5 ohms; d.c. blocking capacitor 45, 0.5 microfarads; in FIG. 6, resistor 63 and capacitor 65 selected to provide a delay interval 61 of one microsecond.

The foregoing describes a ballast circuit for a gas discharge lamp that includes, for controlling a pair of power switches, a self-resonant feedback circuit whose components can be implemented in solid-state form, as opposed to the use of a magnetic transformer. Moreover, the majority of the components of the self-resonant feedback circuit can beneficially be incorporated into an integrated circuit.

While the invention has been described with respect to specific embodiments by way of illustration, many modifications and changes will occur to those skilled in the art. For instance, either electrodeless or electroded gas discharge lamps may be used with the invention. It is, therefore, to be understood that the appended claims are intended to cover all such modifications and changes as fall within the true scope and spirit of the invention.

What is claimed is:

1. A ballast circuit for a gas discharge lamp, comprising:
    (a) a resonant load circuit incorporating a gas discharge lamp and including first and second resonant impedances whose values determine the operating frequency of said resonant load circuit;
    (b) a d.c.-to-a.c. converter circuit coupled to said resonant load circuit so as to induce an a.c. current in said resonant load circuit, and comprising first and second switches serially connected between a bus conductor at a d.c. voltage and ground, and having a common node through which said bidirectional load current flows; and
    (c) a feedback arrangement for regeneratively controlling said first and second switches; said arrangement including a circuit for sensing a.c. current in said resonant load circuit and producing a feedback signal in proportion to said a.c. current; said feedback arrangement further including:
        (i) a comparator circuit for comparing said feedback signal with a periodic reference signal, and for producing a comparator output signal that changes state when a first one of the compared signals becomes greater than the second of the compared signals, and that further changes state when the second of the compared signals then becomes greater than the first of the compared signals;
        (ii) a circuit for generating said periodic reference signal in response to said comparator output signal; and
        (iii) a conditioning circuit receptive of said comparator output signal for controlling said first and second switches.

2. The ballast circuit of claim 1, wherein said conditioning circuit includes a dead time circuit for creating a dead time interval just prior to said first switch being turned on when both said first and second switches are off, and just prior to said second switch being turned on when both said first and second switches are off.

3. The ballast circuit of claim 2, where said dead time circuit includes means for selecting the duration of said dead times intervals from a range of choices.

4. The ballast circuit of claim 1, wherein said circuit for generating said periodic reference signal includes means for selecting the magnitude of current in the lamp from a range of choices.

5. The ballast circuit of claim 1, wherein said circuit for generating a periodic reference signal is effective for producing a substantially triangular reference waveform whose excursions above a reference axis of strength are substantially mirror-images of excursions of the foregoing signal below said reference axis, although shifted in time with respect to each other.

6. The ballast circuit of claim 5, wherein:
    (a) said circuit for producing a feedback signal is effective for producing a feedback waveform whose excursions above a reference axis of strength are substantially mirror-images of excursions of said signal below the foregoing reference axis, although shifted in time with respect to each other; and
    (b) the mentioned reference axes of strength of said periodic reference signal and of said feedback signal are approximately equal to each other.

7. The ballast circuit of claim 1, wherein said circuit for sensing the a.c. current in said resonant load circuit, and producing a feedback signal, comprises a resistance in said resonant load circuit.

8. A ballast circuit for a gas discharge lamp, comprising:
    (a) a resonant load circuit including a gas discharge lamp and first and second resonant impedances whose values determine the operating frequency of said resonant load circuit;
    (b) a d.c.-to-a.c. converter circuit coupled to said resonant load circuit so as to induce an a.c. current in said resonant load circuit, and comprising first and second power switches serially connected between a bus conductor at a d.c. bus voltage and ground, and having a common node through which the a.c. load current flows; and
    (c) a feedback arrangement for regeneratively controlling said first and second switches; said arrangement including a circuit for sensing a.c. current in said resonant load circuit and producing a feedback signal in proportion to said a.c. current; said feedback arrangement further including:
        (i) a comparator circuit for comparing said feedback signal with a periodic reference signal, and for producing a comparator output signal that changes state when a first one of the compared signals becomes greater than the second of the compared signals, and that further changes state when the second of the compared signals then becomes greater than the first of the compared signals;
        (ii) a circuit for generating said periodic reference signal including means, responsive to said comparator output signal, for causing transitions from a predominantly higher-going portion to a predominantly lower-going portion of said periodic reference signal, and vice-versa; and
        (iii) a conditioning circuit receptive of said comparator output signal for controlling said first and second switches.

9. The ballast circuit of claim 8, wherein said circuit for generating said periodic reference signal comprises a delay circuit for delaying transitioning between said predominantly higher-going portion and said predominantly lower-going portion of said periodic reference signal, so as to assure a stable change of output state of the comparator circuit.

10. The ballast circuit of claim 8, wherein said conditioning circuit includes a dead time circuit for creating a dead time interval just prior to said first switch being turned on when both said first and second switches are off, and just prior to said second switch being turned on when both said first and second switches are off.

11. The ballast circuit of claim 10, where said dead time circuit includes means for selecting the duration of said dead times intervals from a range of choices.

12. The ballast circuit of claim 8, wherein said circuit for generating said periodic reference signal includes means for selecting the magnitude of current in the lamp from a range of choices.

13. The ballast circuit of claim 8, wherein:

(a) said circuit for producing a feedback signal is effective for producing a feedback waveform having excursions above a reference axis of strength that are substantially mirror-images of excursions of said signal below the foregoing reference axis, although shifted in time with respect to each other;

(b) said circuit for generating a periodic reference signal is effective for producing a substantially triangular reference waveform having excursions above a reference axis of strength that are substantially mirror-images of excursions of said reference triangular waveform below the said reference axis, although shifted in time with respect to each other; and (c) the mentioned reference axes of strength of said feedback signal and of said periodic reference signal are approximately equal to each other.

14. The ballast circuit of claim 8, wherein said circuit for generating said periodic reference signal includes means for selecting the magnitude of current in the lamp from a range of choices.

15. The ballast circuit of claim 8, wherein said circuit for generating a periodic reference signal comprises:

(a) a capacitor whose voltage comprises said periodic reference signal;

(b) a resistor having one end coupled to said capacitor and another end coupled to said bus conductor; and (c) a switch serially coupled between said capacitor and said resistor and whose switching state is responsive to said comparator output signal.

16. The ballast circuit of claim 15, wherein said circuit for generating a periodic reference signal further comprises a delay circuit for delaying turn on of said switch coupled between said capacitor and said resistor in response to said comparator output signal, so as to assure a stable change of output state of the comparator circuit.

* * * * *